United States Patent [19]

Smith, Jr. et al.

[11] Patent Number: 4,478,638

[45] Date of Patent: Oct. 23, 1984

[54] HOMOGENOUS ALLOY POWDER

[75] Inventors: Murray S. Smith, Jr., Cincinnati; Roger J. Perkins, Evendale; Robert E. Fryxell; William R. Young, both of Cincinnati, all of Ohio

[73] Assignee: General Electric Company, Cincinnati, Ohio

[21] Appl. No.: 536,233

[22] Filed: Sep. 28, 1983

Related U.S. Application Data

[63] Continuation-in-part of Ser. No. 383,077, May 28, 1982, abandoned.

[51] Int. Cl.³ .................. B23P 6/04; B23K 1/04; B22F 7/02
[52] U.S. Cl. .................. 75/255; 29/402.18; 228/263.13; 228/119
[58] Field of Search .................. 75/255, 251, 246; 428/678; 228/194, 119, 263.13; 29/402.18, 402.07

[56] References Cited

U.S. PATENT DOCUMENTS

| | | | |
|---|---|---|---|
| 2,714,760 | 8/1955 | Boam et al. | 228/263.13 |
| 3,012,903 | 12/1961 | Cape | 228/263.13 |
| 3,024,109 | 3/1962 | Hoppin et al. | 228/263.13 |
| 3,073,269 | 1/1963 | Hoppin et al. | 148/22 |
| 3,108,861 | 10/1963 | Cape | 228/263.13 |
| 3,155,491 | 11/1964 | Hoppin et al. | 75/255 |
| 3,197,858 | 8/1965 | Feduska | 228/194 |
| 3,246,981 | 4/1966 | Quaas et al. | 75/255 |
| 3,632,319 | 1/1972 | Hoppin | 228/194 |
| 3,717,442 | 2/1973 | Knopp | 75/208 R |
| 4,008,844 | 2/1977 | Duval | 228/194 |
| 4,059,217 | 11/1977 | Woodward | 228/263.13 |
| 4,098,450 | 7/1978 | Keller et al. | 228/119 |
| 4,176,433 | 12/1979 | Lee | 228/119 |
| 4,285,459 | 8/1981 | Baladjanian et al. | 228/119 |
| 4,299,629 | 11/1981 | Haack | 75/251 |
| 4,381,944 | 5/1983 | Smith, Jr. et al. | 75/255 |
| 4,389,251 | 6/1983 | Simm et al. | 75/255 |

FOREIGN PATENT DOCUMENTS

| | | | |
|---|---|---|---|
| 0024142 | 2/1981 | European Pat. Off. | 228/119 |
| 2511908 | 3/1982 | France | 228/263.13 |

OTHER PUBLICATIONS

"Guide to Selection of Superalloys", *Metal Progress*, Mid-Jun. 1978, pp. 106-107.

*Primary Examiner*—L. Dewayne Rutledge
*Assistant Examiner*—John J. Zimmerman
*Attorney, Agent, or Firm*—Lee H. Sachs; Derek P. Lawrence

[57] ABSTRACT

A powder mixture for use in a method of repairing a superalloy article includes first and second Ni base superalloy powders. The first powder, characterized by superior hot corrosive resistance along with good oxidation resistance and the substantial absence of melting point depressants selected from Si and B greater than normal impurity levels, is included in the range of 30–70 wt % of the mixture. The second powder has a composition substantially within the same composition range as that of the first powder with the inclusion, by wt, of 0.5–5% B and up to 6% Si.

3 Claims, 1 Drawing Figure

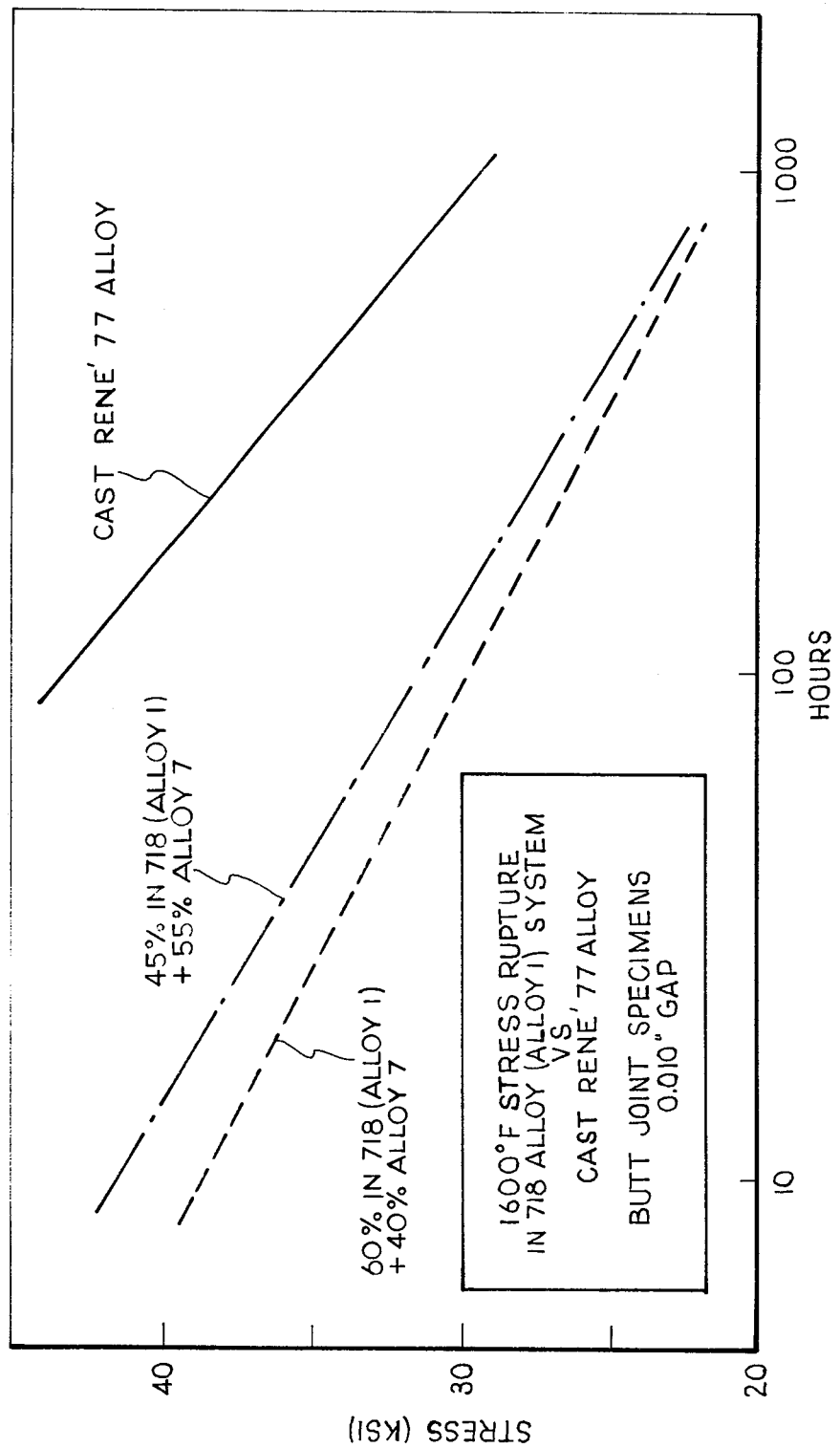

HOMOGENOUS ALLOY POWDER

CROSS REFERENCE TO RELATED APPLICATIONS

This is a continuation-in-part of previously filed application Ser. No. 383,077, filed May 28, 1982, now abandoned.

This application relates to copending and concurrently filed application serial no. 383, 078, now U.S. Pat. No. 4,381,944, entitled "Superalloy Article Repair Method and Alloy Powder Mixture".

BACKGROUND OF THE INVENTION

1. Field of the Invention

This invention relates to the repair of superalloy articles, and, more particularly, to an alloy powder mixture and a method for the repair of nickel-base and cobalt-base superalloy articles.

2. Description of the prior art.

Nickel-base and cobalt-base superalloys are used in high temperature operating gas turbine engine components because of the high temperature operating conditions. However, because such operating conditions are strenuous, cracks or other types of damage or deterioration can occur from such experiences as thermal cycling or airborne object impact, or their combinations. Also, discontinuities such as shrinkage, inclusions and cracks can occur during manufacture of such components. Because of the relatively high cost of such components, it is desirable to repair rather than to replace such articles.

One method for cleaning and repairing superalloy articles is described in U.S. Pat. No. 4,098,450—Keller et al issued July 4, 1978 and assigned to the assignee of the present invention. Described is a method using fluoride ions to contact oxide in a narrow crack or crevice to convert the oxide to gaseous fluoride. Subsequently, in one form of the invention, a repair alloy is applied to repair the crack or crevice.

In other repair methods which have been used for many years in the gas turbine engine art, oxides have been removed from parts to be repaired by mechanical means, or, predominantly in the case of cobalt-base alloys, through the use of hydrogen prior to application of a brazing alloy of the single alloy or wide-gap brazing mixture type. Such wide-gap brazing alloys have been described in the art, for example in U.S. Pat. No. 3,155,491—Hoppin et al issued Nov. 3, 1964.

Currently in use in certain gas turbine engines are nickel-base superalloy turbine vane castings one type of which is made from a nickel-base superalloy commercially available as René 77 alloy and consisting nominally, by weight, of 0.015% B, 0.07% C., 15% Cr, 4.2% Mo, 3.3% Ti, 4.3% Al, 15% Co, with the balance Ni and incidental impurities. It has been observed that such a vane casting can develop damage, such as areas of corrosion, airborne particle contact, a number of small cracks, or their combinations, as a result of operation at high temperatures. Currently, such cracks are repaired by methods such as welding or by use of the above-described method of the Keller et al patent. Repair alloys in the form of powder mixtures used in the Keller et al method heretofore include high and low melting components which are non-homogenous in that they are based on different alloy systems. In one example for the repair of René 77 alloy, the high melting component was René 77 alloy in powder form and the low melting component was a Ni-base-Cr-Co-Ta-Al-B alloy powder sometimes called D-15 alloy and described in U.S. Pat. No. 3,759,692—Zelahy, issued Sep. 18, 1973. Other powder mixtures include D-15 alloy with René 80 alloy and with X-40 alloy, both of which are commercially available. The result using such powder mixtures is a repair material which has hot corrosion resistance less than is desirable for present intended applications, particularly if the repaired article is not coated subsequently.

SUMMARY OF THE INVENTION

It is a principal object of this invention to provide an alloy powder mixture of improved hot corrosion resistance, which is homogenous in that both high and low melting components of the mixture are based on the same, homogenous base alloy system, with one component including at least one melting point depressant.

Another object is to provide such a powder which can be used in the repair of discontinuities or damage in the surface of or through nickel-base or cobalt-base superalloy articles.

These and other objects and advantages will be more fully understood from the following detailed description and the examples all of which are intended to be typical of rather than limiting in any way on the scope of the present invention.

Briefly, the powder mixture of the present invention is a mixture of a nickel-base superalloy first powder and a nickel-base superalloy second powder. In combination, the two powders define a homogenous powder system.

The first powder, which has superior hot corrosion resistance along with good oxidation resistance and mechanical properties, is further characterized by the substantial absence of melting point depressant elements selected from Si and B in amounts greater than 1 wt % Si and 0.05 wt % B. The first powder is further characterized by less than about 2% wt Al, less than about 3% Co and at least about 16% wt Cr, for example, consisting essentially of, by weight, 0.01–0.2% C, 16–23% Cr, 2–10% Mo, 15–21% Fe, up to 6% of the sum of Cb and Ta, up to 2% Ti, less than 1% Al, less than 3% Co, up to 2% W, with the balance Ni and incidental impurities.

The second powder of the homogenous mixture of the present invention has a composition which includes all of the elements of the first powder each, except for elements selected from Si and B, within the respective percentage range of that of the first powder, the second powder consisting essentially of, by weight, 0.01–0.2% C, 16–23% Cr, 2–10% Mo, 15–21% Fe, up to 6% of the sum of Cb and Ta, up to 2% Ti, less than 2% Al, less than 3% Co, up to 2% W, 0.5–5% B, up to 6% Si, with the balance Ni and incidental impurities. A preferred form of the present invention is one in which the first powder consists essentially of, by weight, 0.02–0.08% C, 16–21% Cr, 2.5–3.5% Mo, 15–21% Fe, 4.5–5.5% of the sum of Cb and Ta, 0.7–1.2% Ti, 0.3–0.7% Al, up to 1% Co, with the balance Ni and incidental impurities and in which the second powder includes, in addition, 2–2.5 wt % B. Another preferred form of the present invention is one in which the first powder consists essentially of, by weight, 0.05–0.15% C, 19–23% Cr, 7–10% Mo, 16–20% Fe, 0.5–2.5% Co, 0.2–1% W, with the balance Ni and incidental impurities and in which the second powder includes, in addition, 3–4 wt % B.

The mixture of powders of the present invention consists essentially of, by weight, 30-70% of the first powder and 30-70% of the second powder.

The method associated with the present invention includes providing such a homogenous alloy powder mixture with the proportion of the first powder to the second powder selected so that consolidation of powders occurs at the intended temperature of application of the powder mixture: the low melting component melts and bonds and/or diffuses with the high melting component which may partially melt. Bulk powder mixture shrinkage occurs, preferably approaching theoretical density, and discontinuities are filled. After cleaning the article at least in the portion to be repaired, the mixture is applied to the cleaned portion of the article and then heated in a vacuum at a temperature at which both powder components of the mixture will consolidate substantially completely.

BRIEF DESCRIPTION OF THE DRAWING

The drawing is a graphical comparison of certain stress rupture properties of the mixture of the present invention with cast René 77 alloy.

DESCRIPTION OF THE PREFERRED EMBODIMENTS

Vane assemblies used in the turbine section of gas turbine engines experience strenuous operating conditions including a combination of mechanical stresses and thermal stresses. Accordingly, such vane assemblies have been designed to be air cooled and have been manufactured from costly superalloys, particularly of the nickel-base superalloy type. A variety of such vane assemblies have been described in the art, one example of which is U.S. Pat. No. 3,628,880—Smuland et al patented Dec. 21, 1971 and assigned to the assignee of the present invention. Because of the high cost of manufacturing such a high temperature operating article, generally it is more economical to repair such a component rather than to replace it after wear or damage has occurred. The present invention provides an improved repair powder mixture and a method which extends the service life of such a component further than present repair methods.

During the evaluation of the present invention, a wide variety of powdered alloys with potential use as the "system base alloy" (first powder) of the mixture were studied. Modifications to such potential system base alloys through the addition of boron (B), sometimes in combination with silicon (Si), were evaluated for potential use as the modified alloy (second powder).

The present invention recognizes that a particularly defined alloy first powder, having superior hot corrosion resistance along with good oxidation resistance and mechanical properties, can be modified through the addition of, by weight, 0.5-5% B and optionally up to 6% Si to provide a homogeneous alloy powder mixture. Such a mixture can be provided through the combination of the unmodified or system base alloy with the modified alloy derived from such system base alloy, in the range of, by weight, 30-70% of the system base alloy (first powder) and 30-70% of the modified alloy (second powder). If the intended application of the alloy powder mixture of the present invention is for the repair of tight cracks at a selected repair temperature, then the ratio between the first and second powders in the mixture can be adjusted to provide adequate melting and flow for such purpose.

The present invention uses the highly effective melting point depressant elements B and optionally Si in a specific range to modify a nickel-base superalloy which is characterized by the substantial absence of those melting point depressants in amounts greater than their normal impurity levels. It further recognizes that a mixture of such modified alloy with its parent alloy in a powder combination results in a unique homogenous-base alloy powder mixture.

Selection of the system base alloy as the first powder of the mixture and which is modified according to the present invention is dependent, at least in part, on the type of article to be repaired. For example, as was mentioned above, certain gas turbine engine turbine vanes are manufactured from the above-described commercially available René 77 alloy. Therefore, evaluation of the present invention compares certain system base alloys, modified alloys and mixtures of the two with mechanical, corrosion and oxidation data for René 77 alloy as a standard. The data in the following tables, particularly in Tables IV, V and VI and in the drawing show the capability of the present invention for extending the life of the component repaired using the mixture.

Because nickel-base superalloys such as René 77 have a melting temperature in the range of 2350°-2450° F., the mixtures of powders shown in the following tables as specific examples were selected to be applied and melted in the range of 2150°-2225° F. or below. However, it will be understood by those skilled in the art that other repair temperatures and other mixtures of powders within the scope of the present invention can be selected in connection with a particular article.

The following Tables I, IIA, IIB, and III identify the composition of system base alloys, modified alloys and mixtures of alloys evaluated in connection with the present invention, with Tables IIA and IIB specifying modifications of the alloys of Table I. Unless otherwise stated, percentages herein are by weight.

TABLE I

SYSTEM BASE ALLOYS
(wt %, Balance Ni and incidental impurities)

|  | ALLOY 1 IN 718 | ALLOY 2 HASTELLOY X | ALLOY 3 NIMONIC 91 | ALLOY 4 IN 738 | ALLOY 5 NORMALLOY | ALLOY 6 RENE' 77 |
|---|---|---|---|---|---|---|
| Si | .35 max | 1 max | .05 max | 0.3 max | 0.6-0.8 | 0.2 max |
| B | .006 max | .008 max | .003 max | .005-.015 |  | .012-.02 |
| C | .02-.08 | .05-.2 |  | .15-.2 | .4-.6 | .05-.09 |
| Cr | 16-21 | 19-23 | 26-30 | 15-16.5 | 22-24 | 14-15.3 |
| Mo | 2.5-3.5 | 7.5-10 |  | 1.4-2. |  | 3.9-4.5 |
| Fe | 15-21 | 15-20 |  | 0.5 max. |  | .5 max |
| Cb | Cb + Ta |  | 0.5-0.9 | 0.5-1.5 |  |  |
| Ta | = 4.6-5.5 |  |  | 1.5-2. | 2.5-3.5 |  |
| Ti | .7-1.2 |  | 1.5-2.6 | 3-4 |  | 3-3.7 |
| Al | .3-.7 |  | 1.0-1.4 | 3-4 | 3.5-4.5 | 4-4.6 |
| Co | 1 max | .5-2.5 | 18-21 | 7.5-9. | 32.5-33.5 | 14.2-15.8 |

TABLE I-continued

SYSTEM BASE ALLOYS
(wt %, Balance Ni and incidental impurities)

|    | ALLOY 1 IN 718 | ALLOY 2 HASTELLOY X | ALLOY 3 NIMONIC 91 | ALLOY 4 IN 738 | ALLOY 5 NORMALLOY | ALLOY 6 RENE' 77 |
|----|----|----|----|----|----|----|
| W  |    | .2–1 |    | 2–3 | 2.5–3.5 |    |
| La |    |    |    |    | .005–.01 |    |
| Zr |    |    |    | .05–.15 |    |    |

TABLE IIA

SYSTEM BASE ALLOYS MODIFIED WITH B AND/OR Si
(wt %, Balance Ni and incidental impurities)

| SYSTEM BASE ALLOY | 1 | 1 | 1 | 2 | 2 | 2 |
|---|---|---|---|---|---|---|
| MODIFIED ALLOY: | 7 | 8 | 9 | 10 | 11 | 12 |
| Si | .35 max | 2.0–2.5 | .35 max | 1 max | 1 max | 1.8–2.2 |
| B | 2.0–2.8 | .8–1.2 | 2.8–3.2 | 2.8–3.4 | 1.8–2.2 | 1.0–1.2 |
| C | .02–.08 | .02–.08 | .02–.08 | .05–.15 | .05–.2 | .05–.2 |
| Cr | 16.5–20.4 | 16.6–20.3 | 16–21 | 19.8–22 | 19–23 | 19–23 |
| Mo | 2.7–3.2 | 2.7–3.2 | 2.5–3.5 | 7.7–9 | 7.5–10 | 7.5–10 |
| Fe | 16–19.9 | 16–19.9 | 15–21 | 16.4–19 | 15–20 | 15–20 |
| Cb + Ta | 4.6–5.3 | 4.6–5.3 | 4.6–5.5 |    |    |    |
| Ti | .7–1.1 | .7–1.1 | .7–1.2 |    |    |    |
| Al | .3–.7 | .3–.7 | .3–.7 |    |    |    |
| Co | 1 max | 1 max | 1 max | .5–2.5 | .5–2.5 | .5–2.5 |
| W |    |    |    | .2–1 | .2–1 | .2–1 |

TABLE IIB

SYSTEM BASE ALLOYS MODIFIED WITH B AND/OR Si
(wt %, Balance Ni and incidental impurities)

| SYSTEM BASE ALLOY | 3 | 3 | 3 | 4 | 4 | 4 | 5 | 5 |
|---|---|---|---|---|---|---|---|---|
| MOD. ALLOY: | 13 | 14 | 15 | 16 | 17 | 18 | 19 | 20 |
| Si | 1.5–2.5 |    |    |    | 1.5–2.5 |    | .6–.8 | .6–.8 |
| B | 1.0–1.5 | 1.5–2.2 | 2.3–2.7 | 2.0–2.5 | 1.0–1.5 | 2.8–3.2 | 1.7–2.3 | .8–1.2 |
| C |    |    |    | .15–.2 | .15–.2 | .15–.2 | .4–.6 | .4–.6 |
| Cr | 26.5–28.5 | 27–29 | 26–30 | 15.4–15.9 | 15.0–15.5 | 15–16.5 | 22.5–23.5 | 22–24 |
| Mo |    |    |    | 1.5–2.0 | 1.4–1.9 | 1.4–2 |    |    |
| Cb | .5–.9 | .5–.9 | .5–.9 | .6–1.1 | .6–1.1 | .5–1.5 |    |    |
| Ta |    |    |    | 1.5–2. | 1.4–1.9 | 1.5–2. | 2.5–3.5 | 2.5–3.5 |
| Ti | 1.9–2.5 | 2.0–2.6 | 1.5–2.6 | 3.1–3.6 | 3.1–3.5 | 3–4 |    |    |
| Al | 1.0–1.4 | 1.0–1.4 | 1.0–1.4 | 3.1–3.6 | 3.1–3.5 | 3–4 | 3.5–4.5 | 3.5–4.5 |
| Co | 18–20 | 18.5–20.5 | 18–21 | 7.8–8.8 | 7.6–8.5 | 7.5–9 | 32.5–33.5 | 32.5–33.5 |
| W |    |    |    | 2.3–2.7 | 2.3–2.7 | 2.5–3.5 | 2.5–3.5 | 2.5–3.5 |
| La |    |    |    |    |    |    | .005–.01 | .005–.01 |
| Zr |    |    |    | .05–.15 | .05–.15 | .05–.15 |    |    |

TABLE III

MIXTURE OF POWDERS (normal wt %)

| MIXTURE | Base ALLOY No. | % | MODIFIED ALLOY No. | % |
|---|---|---|---|---|
| A | 1 | 60 | 7  | 40 |
| B | 2 | 50 | 10 | 50 |
| C | 3 | 40 | 14 | 60 |
| D | 4 | 50 | 16 | 50 |
| E | 5 | 50 | 19 | 50 |
| F | 1 | 60 | 8  | 40 |
| G | 2 | 40 | 12 | 60 |
| H | 3 | 55 | 13 | 45 |
| I | 4 | 50 | 17 | 50 |

Table I presents a variety of system base alloys, with alloy 1 (IN 718 alloy) and alloy 2 (Hastelloy X alloy) representing alloys within the specifically preferred range of the present invention as the first powder. Alloys 3 through 6 are others which were evaluated in connection with this invention, with alloy 6 presenting the composition range of René 77 alloy, used as the standard for comparison.

Tables IIA and IIB identify the composition ranges of alloys which were modifications of the alloys in Table I, with the addition of B and optionally Si. Except for B and, in some examples, Si, the modified alloys of Tables IIA and IIB include all the elements and fall within the range of the system base alloy from which they were derived. In Table IIA, alloys 7 through 12, modified from alloys 1 and 2, are within the scope of the preferred range of the present invention based on the best combination of hot corrosion and oxidation resistance, apparently from the inclusion in their composition of less than 3% Co therein less than 2% Al and at least 16% Cr based on the system base alloy from which they were derived. This balance of the content of Al, Co and Cr is based on environmental resistance data represented by that presented in the tables below.

Table III presents some mixtures of system base alloy powders and modified alloy powders used in the evaluation of the present invention. Because hot corrosion resistance is an important characteristic for most high temperature applications of the powders and mixtures of powders of the present invention, the alloys in Tables, I, IIA and IIB and the mixture of powders in Table III were evaluated under the conditions shown in Tables IV and V. The test specimens were in cast form.

TABLE IV

AVERAGE HOT CORROSION TEST DATA
1300°/10 ppm sea salt/2% fuel sulfur
(mils maximum penetration after 500 hrs)

| SYSTEM BASE ALLOY | mils | CAST B MOD ALLOY No. | mils | CAST MIXTURE OF POWDERS Mix | mils | CAST B + Si MOD. ALLOY No. | mils | CAST MIXTURE OF POWDERS Mix | Mils |
|---|---|---|---|---|---|---|---|---|---|
| 1 | 0.3[a] | 7 | 1.7 | A | 0.7 | 8 | 1.0 | F | 0.6 |
| 2 | 1.2 | 10 | 1.6 | B | 1.0 | 12 | 1.2 | G | 1.6 |
| 3 |  | 14 | 0.8 | C | 0.8 | 13 | 0.3 | H | 0.2 |
| 4 |  | 16 | 5.9 | D | 5.9 | 17 | 5.9 | I | 6.9 |
| 5 |  | 19 | 2.4 | E | 5.9 | — | — | — | — |
| 6 | 6[b] |  |  |  |  |  |  |  |  |

[a] 250 hrs
[b] Standard selected for comparison

TABLE V

AVERAGE HOT CORROSION TEST DATA - CAST ALLOY PINS
1700° F./5 ppm sea salt
(mils maximum penetration after 500 hrs)

| SYSTEM BASE ALLOY | | CAST MODIFIED ALLOYS (nominal wt % additive) | | | | | | | | | | | |
|---|---|---|---|---|---|---|---|---|---|---|---|---|---|
| | | 1% B | | 1.5% B | | 2% B | | 2.5% B | | 3% B | | 2.5% Si + 1% B | |
| No. | mils | No. | mils | No. | mils | No. | mils | No. | mils | No. | mils | No. | mils |
| 1 | 5 |  |  |  |  | 7 | 5 |  |  | 9 | 6 | 8 | 4 |
| 2 | 5 |  |  |  |  | 11 | 3 |  |  | 10 | 5 |  |  |
| 3 |  |  |  | 14 | 6 |  |  | 15 | 7 |  |  | 13 | 4 |
| 4 | 10 |  |  |  |  | 16 | 8 |  |  | 18 | 6 | 17 | 3 |
| 5 |  | 20 | 1.6 |  |  | 19 | 0.8 |  |  |  |  |  |  |
| 6[a] | 30-60 |  |  |  |  |  |  |  |  |  |  |  |  |

[a] Standard Corrosion values for Rene 77 alloy selected for comparison

With reference to Table IV, it is to be noted that all system base alloys and all of their modifications and mixtures show good average hot corrosion resistance, at least about as good as and generally better than René 77 alloy (alloy 6). Alloy 6 is one from which certain vane castings are made and which has good hot corrosion resistance. In this evaluation, it was used as a standard for comparison. System base alloys 1, 2 and 3 showed particularly good hot corrosion resistance.

Table V presents 1700° F. average hot corrosion test data on a variety of cast modified alloys as well as on the system base alloy. As in Table IV, system base alloys 1, 2 and 3 and their various modifications show excellent hot corrosion resistance at 1700° F. under the conditions stated.

TABLE VI

1800° F. DYNAMIC OXIDATION TEST
RESULTS - CAST ALLOY PINS
(mils maximum penetration after 650 hrs)

| SYSTEM BASE ALLOY | | CAST MODIFIED ALLOYS | |
|---|---|---|---|
| No. | mils | No. | mils |
| 1 |  | 7 | 2.4 |
| 1 |  | 9 | 4.8 |
| 2 | 1.9 | 11 | 4.0 |
| 2 |  | 10 | 5.1 |
| 3 |  | 13 | 13.8 |
| 4 | 2.8 | 18 | 5.9 |
| 4 |  | 17 | 4.8 |
| 6 | 2.0-2.6[a] |  |  |

[a] Standard selected for comparison

Because of the cyclic high temperature oxidation conditions experienced in the hotter operating portions of gas turbine engines, dynamic oxidation resistance is important to the alloys used in the mixture of the present invention. Table VI presents some 1800° F. dynamic oxidation test results on cast alloy pin specimens of the system base alloys and of modified alloys derived from such system base alloys. The cyclic oxidation resistance of the modifications to system base alloys 1 and 2 is good.

Based on the hot corrosion data of Tables IV and V and the dynamic oxidation data of Table VI, it can be seen that the mixture of the present invention, and particularly those based on alloys 1 and 2, provides a good combination of corrosion and oxidation resistance.

The drawing presents a comparison of 1600° F. stress rupture data for mixtures within the scope of the present invention and for cast base alloy René 77, used for turbine nozzle segments. For the repair of parts, generally it is preferred to use a repair alloy which will withstand the highest stress to which any region of the part will be subjected. Also the repair alloy should have oxidation and corrosion resistance about the same as or better than the alloy of the part. However, generally, such cast nozzle segments are relatively lowly stressed, except in certain regions such as flanges, and can be repaired using a lesser strength material. As shown in the drawing, mixtures within the scope of the present invention have a 1600° F. stress rupture life of about 70% of that the cast base alloy René 77. This property was determined to be very acceptable for repair of such nozzle segment areas which commonly need to be repaired. The excellent oxidation and hot corrosion resistance of the mixture of the present invention has been shown in tables above.

TABLE VII

POWDER MELTING DATA

| Powder | Temp °F. | % Melted |
|---|---|---|
| Alloy 7 | 2200 | 100 |

TABLE VII-continued
POWDER MELTING DATA

| Powder | Temp °F. | % Melted |
| --- | --- | --- |
| Alloy 7 | 2125 | 0 |
| 35% Alloy 7 + 65% Alloy 1 | 2200 | 100 |
| 30% Alloy 7 + 70% Alloy 1 | 2200 | 100 |
| Alloy 8 | 2200 | 100 |
| Alloy 8 | 2125 | 0 |
| 50% Alloy 8 + 50% Alloy 1 | 2200 | 100 |
| 45% Alloy 8 + 55% Alloy 1 | 2200 | 95-100 |
| Alloy 10 | 2250 | 100 |
| Alloy 10 | 2200 | 5 |
| 60% Alloy 10 + 40% Alloy 2 | 2250 | 5 |
| Alloy 12 | 2250 | 100 |
| Alloy 12 | 2200 | 90 |
| 60% Alloy 12 + 40% Alloy 2 | 2250 | 5 |
| Alloy 13 | 2200 | 100 |
| Alloy 13 | 2125 | 0 |
| 60% Alloy 13 + 40% Alloy 3 | 2200 | 25 |
| 40% Alloy 13 + 60% Alloy 3 | 2250 | 100 |
| Alloy 14 | 2200 | 100 |
| Alloy 14 | 2125 | 2 |
| 85% Alloy 14 + 15% Alloy 3 | 2200 | 75 |
| 35% Alloy 14 + 65% Alloy 3 | 2250 | 100 |
| Alloy 16 | 2200 | 100 |
| Alloy 16 | 2125 | 0 |
| 45% Alloy 16 + 55% Alloy 4 | 2150 | 100 |
| 40% Alloy 16 + 60% Alloy 4 | 2200 | 75 |
| Alloy 17 | 2250 | 100 |
| Alloy 17 | 2200 | 95 |
| 35% Alloy 17 + 65% Alloy 4 | 2250 | 100 |
| 25% Alloy 17 + 75% Alloy 4 | 2250 | 95 |
| Alloy 19 | 2250 | 100 |
| Alloy 19 | 2200 | 5 |
| 60% Alloy 19 + 40% Alloy 5 | 2250 | 90 |

The above Table VII presents some powder melting data based on testing conducted on powder disposed on test specimens.

As was mentioned before, an object of the specific examples presented in the application was to prepare a powder mixture which would consolidate at a temperature of up to about 2225° F. The data fo Table VII are presented to show that by adjusting the proportions between the first powder and the second powder of the mixture of the present invention, the desired consolidation temperature, balance between porosity in the buildup, and wettability and flow properties can be obtained in a homogenous system.

The mixture of the present invention consists essentially of, by weight, 30-70% of the first powder and 30-70% of the second powder. Greater than 70% of the first powder results in a structure which is too porous after melting and solidifying. Greater than 70% of the second powder becomes too fluid upon melting and tends to flow away from its intended area of application. Within the range of the present invention, the melting point of the second or lower melting alloy is raised so quickly by the first or system base powder that the mixture can stay in place on an inclined surface. This repair is accomplished with little or no sacrifice in structural material properties.

A statistical analysis was conducted of process parameters, such as height of green buildup, binders to hold the mix initially, alloy mix using Alloy 1 and Alloy 7 within the range of this invention, times from 5 to 30 minutes, and temperature. The results of the analysis showed that temperature is by far the most influential process variable in regard to porosity, diffusion and height of buildup. With such composition, the combined effect of time and temperature also influence all three characteristics, but to a lesser degree than temperature alone. The preferred form of the method of the present invention for the mixture of Alloy 1 and Alloy 7 or Alloy 8 includes heating at about 2200° F. for about 30 minutes in vacuum. To allow the article being repaired and the repair alloy to arrive at a uniform repair temperature and to limit solid state diffusion, it is preferred to stabilize thermally at a temperature below the melting temperature of the lower melting component of the mixture, for example at 1900° F., and then increase the temperature rapidly to the repair temperature.

Although the present invention has been described in connection with specific examples, it will be understood by those skilled in the art that the present invention is capable of variations and modifications within the scope of the invention as represented by the appended claims.

What is claimed is:

1. A mixture of a Ni base superalloy first powder and a Ni base superalloy second powder, the combination defining a homogenous powder system;

the first powder characterized by superior hot corrosion resistance along with good oxidation resistance and mechanical properties, and the substantial absence of melting point depressant elements selected from the group consisting of Si and B in amounts greater than 1 wt % Si and 0.05 wt % B;

the first powder consisting essentially of, by weight, 0.01-0.2% C, 16-23% Cr, 2-10% Mo, 15-21% Fe, up to 6% of the sum of Cb and Ta, up to 2% Ti, less than 2% Al, less than 3% Co, up to 2% W, with the balance Ni and incidental impurities; and the second powder having a composition which includes all of the elements of the first powder each, except for elements selected from the group consisting of Si and B, within the respective percentage range of that of the first powder, the second powder consisting essentially of, by weight, 0.01-0.2% C, 16-23% Cr, 2-10% Mo, 15-21% Fe, up to 6% of the sum of Cb and Ta, up to 2% Ti, less than 2% Al, less than 3% Co, up to 2% W, 0.5 ∝ 5% B, up to 6% Si, with the balance Ni and incidental impurities, and having a melting temperature lower than that of the first powder;

the mixture consisting essentially of, by weight, 30-70% of the firt powder and 30-70% of the second powder.

2. The mixture of claim 1 in which:

the first powder consists essentially of, by weight, 0.02-0.08% C, 16-21% Cr, 2.5-3.5 Mo, 15-21% Fe, 4.5-5.5% of the sum of Cb and Ta, 0.7-1.2% Ti, 0.3-0.7% Al, up to 1% Co, with the balance Ni and incidental impurities; and the second powder consists essentially of, by weight, 0.02-0.08% C, 16-21% Cr, 2.5-3.5% Mo, 15-21% Fe, 4.5-5.5% of the sum of Cb and Ta, 0.7-1.2% Ti, 0.3-0.7% Al, up to 1% Co, 2-2.5% B, with the balance Ni and incidental impurities.

3. A mixture of claim 1 in which:

the first powder consists essentially of, by weight, 0.05-0.15% C, 19-23% Cr, 7-10% Mo, 16-20% Fe, 0.5-2.5% Co, 0.2-1% W, with the balance Ni and incidental impurities; and the second powder consists essentially of, by weight, 0.05-0.15% C, 19-23% Cr, 7-10% Mo, 16-20% Fe, 0.5-2.5% Co, 0.2-1% W, 3-4% B, with the balance Ni and incidental impurities.

* * * * *